United States Patent [19]

Brown et al.

[11] Patent Number: 5,026,674
[45] Date of Patent: Jun. 25, 1991

[54] PROCESS FOR PREPARING POLYKETONES

[75] Inventors: Stephen L. Brown, Ashford; Andrew R. Lucy, Camberley, both of England

[73] Assignee: The British Petroleum Company p.l.c., London, England

[21] Appl. No.: 462,233

[22] Filed: Jan. 8, 1990

Related U.S. Application Data

[62] Division of Ser. No. 249,848, Sep. 27, 1988, Pat. No. 4,925,918.

[30] Foreign Application Priority Data

Oct. 8, 1987 [GB] United Kingdom ................ 8723603

[51] Int. Cl.$^5$ .......................... B01J 31/22; B01J 31/24
[52] U.S. Cl. ..................................... 502/154; 502/162; 502/167
[58] Field of Search ....................... 502/154, 162, 167

[56] References Cited

U.S. PATENT DOCUMENTS

| | | | |
|---|---|---|---|
| 4,831,114 | 5/1989 | Drent | 502/162 X |
| 4,859,764 | 8/1989 | Drent et al. | 502/167 X |
| 4,880,902 | 11/1989 | Van Doorn et al. | 502/162 X |
| 4,925,917 | 5/1990 | Wife et al. | 502/162 X |
| 4,933,311 | 6/1990 | Van Doorn et al. | 502/162 |
| 4,935,396 | 6/1990 | Van Doorn et al. | 502/162 X |
| 4,948,870 | 8/1990 | Van Doorn et al. | 502/162 X |

Primary Examiner—Patrick P. Garvin
Attorney, Agent, or Firm—Brooks, Haidt, Haffner & Delahunty

[57] ABSTRACT

A process for preparing interpolymers of an olefin(s) and carbon monoxide (polyketones) is provided. The process employs a palladium catalyst prepared by reacting together a palladium source, a bidentate amine, phosphine, arsine or stibine and a source of a borate anion. The catalyst effects fast polymerization of the olefin(s) and carbon monoxide in, e.g. methanol or ethoxyethanol solvent. By using the catalyst a lower catalyst deactivation on recycle is observed relative to previously described systems.

6 Claims, No Drawings

PROCESS FOR PREPARING POLYKETONES

This is a division of application Ser. No. 07/249,848, filed 9/27/88 and now U.S. Pat. No. 4,925,918.

The present invention relates to a process for preparing interpolymers of olefins and carbon monoxide by polymerising a mixture of one or more olefins and carbon monoxide in the presence of a palladium catalyst. In particular, the present invention relates to new palladium catalysts for use in such processes.

The preparation of interpolymers of olefins and carbon monoxide having the formula:

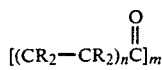

where the R groups are independently hydrogen or hydrocarbyl groups, n is at least 1 and m is a large integer, is known from U.S. Pat. No. 3,694,412. Such interpolymers, which hereafter will be called polyketones, are prepared according to U.S. Pat. No. 3,694,412 by polymerising a mixture of one or more olefins and carbon monoxide in the presence of an aryl phosphine complex of a palladium halide and an inert solvent. However, the processes described in U.S. Pat. No. 3,694,412 are slow even at elevated temperature and pressure.

An improved version of the process described in U.S. Pat. No. 3,694,412 is described in European patent application Nos. 181014 and 121965. It was subsequently found that the rate of the polymerisation process could be increased considerably by using a palladium catalyst with inter alia a bidentate phosphine and the anion of a carboxylic acid having a pKa of lower than 2 (as measured in aqueous solution). Examples of anions which can be used include trichloroacetate, dichloroacetate, tetrafluroborate, hexafluorophosphate and p-toluene sulphonate, such anions being respectively the conjugate anions of trichloroacetic acid (pKa 0.70), dichloroacetic acid (pKa=1.48), tetrafluoroboric acid, hexafluorophosphoric acid and p-toluenesulphonic acid.

More recently EP No. 222454 suggests that any acid having a pKa of less than 5 (determined in aqueous solution at 18° C.) can be used.

It has now been found that if certain boron containing acids are employed then particularly high reaction rates can be achieved. Furthermore, if such acids are used then a lower catalyst deactivation on recycle is observed relative to previously described systems.

According to the present invention there is provided a process for preparing polyketones by polymerising a mixture of carbon monoxide and one or more olefins in the presence of a palladium catalyst characterised in that the palladium catalyst is prepared by reacting together:

(a) a source of palladium, (b) a bidentate amine, phosphine, arsine or stibine having the formula $(R^1)_2M-R^2-M(R^1)_2$ wherein the M atoms are independently selected from nitrogen, phosphorus, arsenic or antimony, the $R^1$ are independently alkyl, cycloalkyl or aryl groups and $R^2$ is an alkylene group, and (c) a source of an anion having the formula:

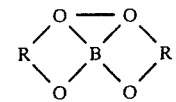

wherein the R groups are independently selected from the group consisting of $C_1$ to $C_6$ alkylene groups, orthophenylene or biphenylene groups or substituted derivatives thereof or groups having the formula:

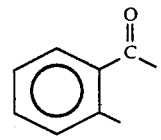

or substituted derivatives thereof.

The term polyketone is used herein to mean an interpolymer of one or more olefins with carbon monoxide. The idealised structure of such a material would comprise a one, two or three dimensional network of strictly alternating olefin and carbon monoxide units. Although polyketones prepared according to the present invention correspond to this idealised structure, it is envisaged that materials corresponding to this structure in the main but containing small regimes (i.e. up to 10 wt %) of the corresponding polyolefin also fall within the definition.

Anions which are preferably employed in the process of the present invention include species such as:

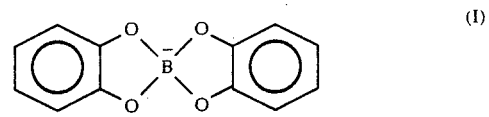

or

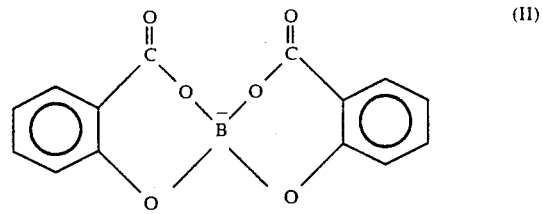

and analogues in which the benzene rings are partially or completely substituted with, e.g. halogen, alkyl or sulphonic acid moieties. Anions corresponding to (I) are hydrolysable and hence the corresponding acid has no measurable pka in aqueous solution. It is a feature of the present invention that palladium catalysts using anion (I) or (II) are more active than those using the anion of p-toluenesulphonic acid, a preferred anion according to EP No. 121965.

The palladium catalyst used in the process described above is itself prepared by reacting together a source of palladium, an appropriate amine, phosphine, arsine or stibine and anion having the formula defined above. As regards the source of palladium this can include simple inorganic and organic salts, e.g. halides, nitrates, carboxylates and the like as well as organometallic and coordination complexes. In some cases, by suitable choice of coordination complex, it may be possible to add the palladium and the amine, phosphine, arsine or stibine aa a single entity.

Although any source of palladium can be used, it may be necessary, when a palladium complex having strongly coordinating ligands is employed, to ensure that such ligands are removed. An example of such a complex is palladium acetate where the acetate anions bind strongly to the palladium. In such cases the acetate anions since such a conjugate acid will protonate the acetate anions and cause their removal.

Another approach which is useful when palladium halides are employed (halide anions also bind strongly to the palladium) is to use a thallium or silver salt of component (c). In such cases a metathesis reaction occurs and the insoluble silver or thallium halide precipitates and can be removed by filtration.

The other component of the catalyst is a bidentate amine, phosphine, arsine or stibine having the formula $(R^1)_2M—R^2—M(R^1)_2$ where the M atoms are independently selected from nitrogen, phosphorus, arsenic or antimony. The $R^1$ groups are independently selected from alkyl, cycloalkyl or aryl groups with $C_1$ to $C_4$ alkyl and phenyl groups being preferred. The $R^2$ group is an alkylene group. In the context of this document alkylene groups are defined as being $—(CH_2)_a(CHR^3)_b—$ groups in which the $R^3$ groups are independently hydrogen, methyl, ethyl or propyl groups and a and b are either zero or integers such that $a+b$ is at least 2, preferably between 2 and 10. Preferably the alkylene group is selected from $—(CH_2)_2—$, $—(CH_2)_3—$, $—(CH_2)_4—$ and $—(CH_2)_5—$. Of these the most convenient species are the bidentate phosphines, 1,2-bis(diphenylphosphino)ethane (diphos), 1,3-bis(diphenylphosphino)propane and 1,4-bis(diphenylphosphino) butane.

The bidentate amines, phosphines, arsines or stibines defined above all either bond exclusively cis to the palladium or there is a reasonable concentration of this cis binding. Whilst not wishing to be held to any theory, it is believed that it is a cis type isomer which is catalytically active.

Considering next the feedstocks for the polymerisation feedstock, it is believed that any source of carbon monoxide can be used. Thus the carbon monoxide may contain nitrogen, inert gases and up to 10% hydrogen.

Any olefin can in theory be used although the best reaction rates are obtained when either ethylene or a mixture of olefins which include ethylene, e.g. ethylene/propylene, ethylene/butylene and the like, is used. The lower rates obtained in the absence of ethylene should not be construed as indicating that the process can be used only with an ethylene feedstock since other olefins such as propylene, 4,methylpentene-1, styrene, acrylates, vinyl acetates and the like all undergo reaction to some extent.

The polymerisation process is suitably carried out in a solvent which is chemically inert under the conditions employed and one in which the palladium catalyst is soluble. Moreover, the solvent like the anion should be either weakly or non-coordinating. Examples of such solvents include alcohols, e.g. methanol, ethanol and propanol, ethers, glycols and glycol ethers. Preferred solvents are methanol or ethoxyethanol.

The polymerisation process is suitably carried out at a temperature in the range 20° to 150° C. and at elevated pressure, (e.g. 1 to 100 bars). The overpressure of gas is suitably carbon monoxide or carbon monoxide and olefin, if the olefin is gaseous under the reaction conditions. It is possible to operate the polymerisation process either batchwise or continuously.

The following Examples illustrate the present invention.

EXAMPLE 1

A stainless steel autoclave of 150 ml capacity was charged with palladium acetate (25 mg), 1,3-bis(diphenylphosphino)propane (65 mg), $H[B(O_2C_6H_4)_2]2DMF$ (800 mg), 1,2-dimethoxyethane (30 ml) and a magnetic stirrer bar. The autoclave was flushed with nitrogen, charged with ethylene (20 bar) followed by carbon monoxide (30 bar), and heated to 100° C. A pressure drop of 9.0 bar was recorded over 1 hour. The autoclave was allowed to cool over a period of 1½ hours, and was vented at 50° C., 4.96 g polymer was subsequently recovered.

EXAMPLE 2

The method of Example 1 was repeated, except that the $H[B(O_2C_6H_4)_2]2DMF$ was replaced by $H[B(OC_6H_4CO_2)_2]$ (600 mg) and the 1,2-dimethoxyethane by methanol (30 ml). After 40 minutes gas uptake had virtually ceased and pressure drop of 31.6 bar had been recorded. The autoclave was allowed to cool and was vented. 6.92 g of polymer was then recovered by filtration under a nitrogen atmosphere. The filtrate was returned to the autoclave and the reaction repeated. A pressure drop of 19.3 bar occured over 1 hour. The autoclave was allowed to cool and was vented, and 4.62 g of polymer recovered.

COMPARATIVE TEST A

The method of Example 2 was repeated, except that the $H[B(OC_6H_4CO_2)_2]$ was replaced by para-toluenesulphonic acid (380 mg). In the first instance, a pressure drop of 25.6 bar and polymer yield of 5.07 g were recorded. On repeating the reaction with the recovered filtrate, a pressure drop of 7.4 bar and a polymer yield of 2.11 g were recorded.

We claim:

1. A palladium catalyst prepared by reacting together:
    (a) a source of palladium,
    (b) a bidentate amine, phosphine, arsine or stibine having the formula $(R^1)_2M—R^2—M(R^1)_2$ wherein the M atoms are independently selected from nitrogen, phosphorus, arsenic or antimony, the $R^1$ groups are independently alkyl, cyclcoalkyl or aryl groups and $R^2$ is an alkylene group, and
    (c) a source of an anion having the formula:

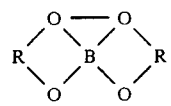

wherein the R groups are independently selected from the group consisting of $C_1$ to $C_6$ alkylene groups, ortho-phenylene groups or substituted derivatives thereof and groups having the formula:

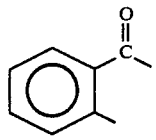

or substituted derivatives, thereof wherein any substituents present are selected from the group consisting of halogen, alkyl and sulphonic acid moieties.

2. A palladium catalyst as claimed in claim 1 wherein the source of palladium is palladium acetate.

3. A palladium catalyst as claimed in claim 1 wherein component (b) is a bidentate phosphine of formula $(R^1)_2P-(CH_2)_a(CHR^3)_bP(R^1)_2$ wherein $R^1$ is independently selected from the group consisting of alkyl, cycloalkyl and aryl groups and the $R^3$ groups are independently selected from the group consisting of hydrogen, methyl, ethyl and propyl and a and b are either zero or integers such that a+b is between 2 and 10.

4. A palladium catalyst as claimed in claim 3 wherein the bidentate phosphine is selected from the group consisting of 1,2-bis(diphenylphosphino)ethane 1,3-bis(diphenylphosphino)propane and 1,4-bis(diphenylphosphino)butane.

5. A palladium catalyst as claimed in claim 1 wherein (c) is $H[B(O_2C_6H_4)_2]$.

6. A palladium catalyst is claimed in claim 1 wherein component (c) is $H[B(OC_6H_4CO_2)_2]$.

* * * * *

UNITED STATES PATENT AND TRADEMARK OFFICE
CERTIFICATE OF CORRECTION

PATENT NO. : 5,026,674

DATED : June 25, 1991

INVENTOR(S) : STEPHEN L. BROWN et al.

It is certified that error appears in the above-identified patent and that said Letters Patent is hereby corrected as shown below:

Col. 1, 1.41, correct the spelling of the word "tetrafluoroborate"

Col. 3, 1.9, after "anions" and before "since", insert --can be removed by adding component (c) above as its conjugate acid--

Signed and Sealed this

Twenty-second Day of December, 1992

Attest:

DOUGLAS B. COMER

Attesting Officer     Acting Commissioner of Patents and Trademarks